Patented Jan. 30, 1940

2,188,340

UNITED STATES PATENT OFFICE 2,188,340

PROCESS OF REACTING METHYL VINYL KETONE WITH HYDROGEN CYANIDE AND PRODUCTS THEREBY OBTAINED

Harry B. Dykstra, Wilmington, Del., assignor to E. I. du Pont de Nemours & Company, Wilmington, Del., a corporation of Delaware No Drawing. Application March 18, 1936, Serial No. 69,589

21 Claims. (Cl. 260—464)

This invention relates to derivatives of methyl vinyl ketone, and more particularly to the conversion of methyl vinyl ketone into levulinonitrile, levulinic acid, levulinic acid esters, and intermediate products. The invention especially relates to a novel method for the preparation of levulinic acid.

An object of this invention is to prepare useful products from methyl vinyl ketone. Another object is to react hydrogen cyanide with methyl vinyl ketone. A further object of this invention is to prepare levulinonitrile, levulinic acid, levulinic acid esters, and intermediate products, from methyl vinyl ketone. Other objects will appear hereinafter.

In accomplishing these objects according to the broader aspects of the invention, it has been found that hydrogen cyanide may be reacted with methyl vinyl ketone under anhydrous conditions. When the reaction is effected with equimolecular proportions of the reactants, levulinonitrile is obtained. Use of an excess of hydrogen cyanide leads to the formation of levulinonitrile cyanhydrin, $CH_3C(OH)(CN)CH_2CH_2CN$.

According to the preferred embodiment of the invention, a new and improved method of producing levulinic acid is provided by a combination of two steps: (1) the reaction of hydrogen cyanide with methyl vinyl ketone to form levulinonitrile, and (2) the hydrolysis of levulinonitrile to levulinic acid. The reactions involved may be represented by the following equations:

(1) $CH_3COCH=CH_2 + HCN \rightarrow CH_3COCH_2CH_2CN$ (2) $CH_3COCH_2CH_2CN + 2H_2O \rightarrow$
$CH_3COCH_2CH_2COOH + NH_3$ Step (1), the reaction of hydrogen cyanide with methyl vinyl ketone, is carried out by adding liquid or gaseous hydrogen cyanide to methyl vinyl ketone at such a rate that the reaction occurs smoothly. Generally, it is desirable to use methyl vinyl ketone containing a polymerization inhibitor, such as hydroquinone, or other suitable antioxidant, and to keep the reaction mixture below the boiling point of methyl vinyl ketone. The reaction is accelerated by the presence of small amounts of certain compounds, such as sodium cyanide, potassium cyanide, and other basic materials. These compounds may be used in the presence or absence of solvents. The use of water is to be avoided since aqueous solutions of the basic compounds cause rapid polymerization of methyl vinyl ketone. In fact, resinous products are formed almost to the exclusion of levulinonitrile when methyl vinyl ketone is treated with an aqueous solution of an alkali cyanide.

The reaction of hydrogen cyanide with methyl vinyl ketone in the presence of a small amount of alkali cyanide is highly exothermic and usually requires external cooling. The use of an inert solvent or diluent is advantageous since it moderates the reaction and makes it easier to control. Use of elevated temperatures is to be avoided since it leads to side reactions, e. g., polymerization of methyl vinyl ketone. Since the reaction is sufficiently rapid at 20°–35° C., it is desirable to operate in this general range.

After the required amount of hydrogen cyanide has been added and the reaction is complete, the reaction mixture, which consists almost entirely of levulinonitrile, is distilled to purify the nitrile. If a basic catalyst has been used, it is desirable to remove or destroy the catalyst prior to distillation. This may be done by adding an acidic compound, such as sulfuric acid or potassium acid sulfate. When the reaction is carried out under carefully controlled conditions, the yield of levulinonitrile is substantially quantitative.

Step (2), the preparation of levulinic acid, involves the hydrolysis of levulinonitrile. In this step it is not necessary to use levulinonitrile which has been purified by distillation; the mixture obtained from the hydrogen cyanide-methyl vinyl ketone reaction can be used directly. The hydrolysis is effected by heating the nitrile with an aqueous solution of mineral acid for a short time. Thirty minutes' heating at 100° C. is generally sufficient. Levulinamide, $CH_3COCH_2CH_2CONH_2$ is an intermediate product in the formation of levulinic acid.

The hydrolysis of levulinonitrile may be carried out in the presence of an alcohol, in which case the corresponding ester of levulinic acid is formed. For example, if a methanol solution of levulinonitrile is heated with concentrated hydrochloric acid, the product is the methyl ester of levulinic acid. A wide variety of esters can be prepared in this way by using various monohydric and polyhydric alcohols, as, for example, butyl alcohol, isobutyl alcohol, octyl alcohol, 9,10-octadecenyl alcohol, benzyl alcohol, cyclohexanol, methylcyclohexanol, glycol, diethylene glycol, glycerol, etc. A catalyst, such as zinc chloride, may be used in addition to the mineral acid. This method of producing levulinic acid esters directly from levulinonitrile is simpler than the method involving the hydrolysis of levulinonitrile to levulinic acid followed by the isolation and esterification of the levulinic acid.

The invention is illustrated more fully by the following examples, in which the quantities are stated in parts by weight.

Example I

Eighty (80) parts of liquid hydrogen cyanide were added to a well cooled reaction vessel containing 200 parts of methyl vinyl ketone, 1 part of hydroquinone and 2 parts of potassium cyanide. An exothermic reaction occurred on addition of the hydrogen cyanide, but the temperature was kept below 40° C. by external cooling and by adding the hydrogen cyanide in portions. When the reaction subsided, the mixture was heated to 50° C., cooled to 0° C., and treated with 1 part of sulfuric acid and 10 parts of potassium acid sulfate. The mixture was then distilled under reduced pressure. This gave a small amount of unreacted methyl vinyl ketone, 230 parts of pure levulinonitrile, and 20 parts of dark residue which consisted largely of methyl vinyl ketone polymer and levulinonitrile cyanhydrin. Levulinonitrile was found to be a clear limpid liquid having a faint ethereal odor. It boiled at 80°–82° C. 1/2 mm. Other properties observed were:

$$d_4^{20} 0.9940; \; n_D^{20} 1.4295$$

M$_R$ (molecular refraction) calcd., 25.12; M$_R$ found, 25.20.

Eighty (80) parts of the above levulinonitrile were hydrolyzed by heating for thirty minutes on a steam bath with 120 parts of concentrated hydrochloric acid. The major portion of the water was removed by distillation under reduced pressure and then about 200 parts of ethanol were added. The mixture was filtered and the filtrate distilled. The product consisted largely of ethyl levulinate, CH$_3$COCH$_2$CH$_2$COOC$_2$H$_5$, boiling at 203° C. Other properties observed for the ester were:

$$d_4^{20} 1.0155; \; n_D^{20} 1.4229$$

The phenyl hydrazone melted at 106°–108° C.

Example II

Gaseous hydrogen cyanide was passed into a well stirred mixture of 70 parts of methyl vinyl ketone, 1 part of hydroquinone, and 1 part of sodium cyanide maintained at 0°–30° C. until an increase in weight of 27 parts was observed. The reaction mixture was heated to 50° C., cooled, and treated slowly with 200 parts of concentrated hydrochloric acid. After heating at 100° C. for about thirty minutes, the mixture was cooled and the levulinic acid present was removed by ether extraction. The levulinic acid was obtained in pure state by evaporating off the ether and distilling the residue. The yield of levulinic acid was in the neighborhood of 80%.

Example III

Gaseous hydrogen cyanide was passed into a well stirred mixture of 70 parts of methyl vinyl ketone, 1 part of hydroquinone and 1 part of sodium cyanide maintained at 0°–30° C. until an increase in weight of 27 parts was observed. The reaction mixture was heated to 60° C., cooled to room temperature, and then treated slowly under stirring with 70 parts of propanol and 200 parts of concentrated hydrochloric acid. The mixture was heated under reflux for two hours. The organic portion was removed as such, dried over magnesium sulfate, and distilled. The product was largely propyl levulinate, boiling at 215°–220° C.

Example IV

Forty (40) parts of liquid hydrogen cyanide were added during the course of two hours to a well stirred mixture of 100 parts of methyl vinyl ketone, 100 parts of benzene, and 1 part of sodium cyanide, the temperature being maintained at 25°–30° C. After addition of the cyanide, the mixture was allowed to stand at 30° C. for two hours. Five (5) parts of potassium bisulfate were then added and, after standing for eighteen hours, the mixture was subjected to fractional distillation. In this way, 119 parts (84% yield) of levulinonitrile was obtained.

In the examples, the hydrogen cyanide is added portionwise to the reaction vessel containing methyl vinyl ketone, but other procedures may be used. The methyl vinyl ketone may be added to the hydrogen cyanide or the two reactants may be slowly and simultaneously added to the reaction vessel. When working with small quantities or in an apparatus having an efficient cooling system, all of the reactants may be mixed at once. The reaction may be carried out at atmospheric pressure with or without reflux, or may be carried out in an autoclave under pressure. The preferred temperature range is 10°–40° C., but temperatures below and above this are operable. It is also within the scope of this invention to carry out the reaction in the presence of an inert solvent or diluent, e. g., ether, benzene, or the like.

The reaction of hydrogen cyanide with methyl vinyl ketone takes place in the absence of an added compound but the use of a basic catalyst, e. g., potassium cyanide, sodium cyanide, calcium cyanide, sodium carbonate, and the like, gives more satisfactory results. As previously indicated, it is desirable to use the catalysts in the absence of water, since aqueous solutions of basic materials cause polymerization of methyl vinyl ketone, even in the presence of the common polymerization inhibitors. Almost no polymerization occurs in the presence of alkali alone if an antipolymerization catalyst, such as hydroquinone, pyrogallol, catechol, guaiacol, eugenol, para-hydroxydiphenyl, and the like, is used.

While the use of hydrogen cyanide and methyl vinyl ketone in molecular proportions is the preferred procedure, it is within the scope of this invention to use an excess of either reagent. When the hydrogen cyanide is used in excess, some levulinonitrile cyanhydrin is formed. The excess of hydrogen cyanide and cyanhydrin may be destroyed by the addition of certain reagents, e. g., ferrous sulfate. The cyanhydrin of levulinonitrile can be obtained as the chief product, if so desired, by using two mols of hydrogen cyanide and one mol of methyl vinyl ketone.

Among the suitable agents which may be used for the hydrolysis of levulinonitrile are aqueous solutions of hydrochloric, hydrobromic, sulfuric, and phosphoric acids. It is within the scope of the invention to stop the hydrolysis before the levulinic acid is formed and obtain levulinamide, CH$_3$COCH$_2$CH$_2$CONH$_2$. This may be done by treating the levulinonitrile with the mineral acids in the cold, e. g., cold concentrated hydrochloric acid, or by mixing the nitrile with glacial acetic acid and concentrated sulfuric acid. The conversion to the amide may also be effected by treating the nitrile in alkaline solution with hydrogen peroxide. The amide may be further hydrolyzed to levulinic acid by heating with aqueous mineral acids.

The invention herein described affords a simple and direct method for the preparation of levulinonitrile and levulinic acid. The yield of levulinonitrile is substantially quantitative, and the overall yield of levulinic acid is in the neighborhood of 80%. This compares with a 22-23% yield of levulinic acid from the reaction of acids with carbohydrates, which is one of the better known prior methods for preparing levulinic acid. Moreover, the preparation of levulinic acid from carbohydrates is cumbersome because the reaction is accompanied by excessive charring and gum formation which makes the separation of levulinic acid rather difficult.

Levulinonitrile is a new and useful compound. It is useful as an intermediate in the preparation of various compounds, e. g., levulinamide, levulinic acid and levulinonitrile cyanhydrin, and levulinic acid esters. Levulinic acid is useful in the preparation of plasticizers, resins and pharmaceuticals, e. g., calcium levulinate.

As many apparently widely different embodiments of this invention may be made without departing from the spirit and scope thereof, it is to be understood that I do not limit myself to the specific embodiments thereof except as defined in the appended claims.

I claim:

1. The process which comprises reacting hydrogen cyanide with methyl vinyl ketone under anhydrous conditions in the liquid state to produce levulinonitrile.

2. The process which comprises reacting hydrogen cyanide with methyl vinyl ketone under anhydrous conditions in the liquid state and in the presence of a basic inorganic cyanide to produce levulinonitrile.

3. The process which comprises reacting hydrogen cyanide with methyl vinyl ketone under anhydrous conditions in the liquid state to produce levulinonitrile, and hydrolyzing said levulinonitrile with a hydrolyzing mineral acid in the liquid phase.

4. The process which comprises reacting anhydrous hydrogen cyanide with methyl vinyl ketone in the presence of a basic inorganic cyanide and at a temperature of 10° C. to 40° C.

5. The process which comprises reacting anhydrous hydrogen cyanide with methyl vinyl ketone in the presence of a basic inorganic cyanide, at a temperature of 10° C. to 40° C., and in the presence of an organic solvent for the reactants and reaction products.

6. The process which comprises reacting anhydrous hydrogen cyanide with methyl vinyl ketone in the presence of a basic inorganic cyanide, at a temperature of 10° C. to 40° C., and in the presence of benzene.

7. The process which comprises reacting anhydrous hydrogen cyanide with methyl vinyl ketone in the presence of a basic inorganic cyanide and at a temperature of 20° C. to 35° C., and heating the product thus obtained with an aqueous solution of a hydrolysing mineral acid in the liquid phase.

8. Levulinonitrile.

9. Levulinonitrilecyanhydrin.

10. The reaction products of methyl vinyl ketone and anhydrous hydrogen cyanide, said products having the formula RCH$_2$CH$_2$CN wherein R is a radical of the class consisting of CH$_3$—CO— and

11. The process which comprises reacting hydrogen cyanide with methyl vinyl ketone under anhydrous conditions in the liquid state and at a temperature of 10° C. to 40° C.

12. The process which comprises reacting anhydrous hydrogen cyanide with methyl vinyl ketone in the presence of an inorganic base and at a temperature of 10° C. to 40° C.

13. The process which comprises reacting hydrogen cyanide with methyl vinyl ketone at a temperature of 10° C. to 40° C. under anhydrous conditions in the liquid state, and hydrolyzing the product thus obtained with a hydrolysing mineral acid in the liquid phase.

14. The process which comprises reacting hydrogen cyanide with methyl vinyl ketone at a temperature of 10° C. to 40° C. under anhydrous conditions in the liquid state, and heating an alcohol solution of the product thus obtained with a hydrolysing mineral acid in the liquid phase.

15. The process which comprises reacting hydrogen cyanide with methyl vinyl ketone at a temperature of 10° C. to 40° C. under anhydrous conditions in the liquid state, and hydrolysing the product thus obtained with an aqueous solution of a hydrolysing mineral acid in the liquid phase.

16. The process which comprises reacting hydrogen cyanide with methyl vinyl ketone at a temperature of 10° C. to 40° C. under anhydrous conditions in the liquid state, and hydrolysing the product thus obtained with an aqueous solution of a hydrolysing mineral acid in the liquid phase in the cold.

17. The process which comprises reacting hydrogen cyanide with methyl vinyl ketone at a temperature of 10° C. to 40° C. under anhydrous conditions in the liquid state and heating the product thus obtained with an aqueous solution of a hydrolysing mineral acid in the liquid phase.

18. The process which comprises reacting anhydrous hydrogen cyanide with methyl vinyl ketone at a temperature of 10° C. to 40° C. in the presence of a basic inorganic cyanide, and heating the product thus obtained with an aqueous solution of a hydrolysing mineral acid in the liquid phase.

19. The process which comprises reacting anhydrous hydrogen cyanide with methyl vinyl ketone at a temperature of 10° C. to 40° C. in the presence of an inorganic base and an antioxidant.

20. The process which comprises reacting hydrogen cyanide with methyl vinyl ketone under anhydrous conditions in the liquid state at a temperature of at least 10° C.

21. The process which comprises reacting hydrogen cyanide with methyl vinyl ketone under anhydrous conditions in the liquid state in the presence of a basic inorganic cyanide and at a temperature of at least 10° C.

HARRY B. DYKSTRA.